United States Patent [19]
Sakai

[11] Patent Number: 6,142,586
[45] Date of Patent: Nov. 7, 2000

[54] BRAKE FORCE CONTROL APPARATUS

[75] Inventor: Akira Sakai, Toyota, Japan

[73] Assignee: Toyota Jidosha Kabushiki Kaisha, Toyota, Japan

[21] Appl. No.: 09/128,977

[22] Filed: Aug. 4, 1998

[30] Foreign Application Priority Data

Aug. 8, 1997 [JP] Japan ..................................... 9-215016

[51] Int. Cl.$^7$ ....................................................... B60T 8/64
[52] U.S. Cl. ............................................................. 303/152
[58] Field of Search .................................. 303/3, 11, 15, 303/152, DIG. 3, DIG. 4; 180/65.2

[56] References Cited

U.S. PATENT DOCUMENTS

| | | | |
|---|---|---|---|
| 5,326,158 | 7/1994 | Ohori et al. | 303/3 |
| 5,358,317 | 10/1994 | Cikanek | 303/3 |
| 5,378,053 | 1/1995 | Patient et al. | 303/3 |
| 5,450,324 | 9/1995 | Cikanek | 303/3 |
| 5,472,264 | 12/1995 | Klein et al. | 303/3 |
| 5,511,859 | 4/1996 | Kade et al. | 303/3 |
| 5,568,962 | 10/1996 | Enomoto et al. | 303/3 |
| 5,927,829 | 7/1999 | Saga et al. | 303/152 |

FOREIGN PATENT DOCUMENTS 7-205800  8/1995  Japan .

*Primary Examiner*—Robert J. Oberleitner
*Assistant Examiner*—Devon Kramer
*Attorney, Agent, or Firm*—Oliff & Berridge, PLC

[57] ABSTRACT

A brake force control apparatus having a hydraulic brake unit for generating a hydraulic brake force and a regenerative brake unit for generating a regenerative brake force is provided which can prevent a driver from having an unnatural feeling due to a discontinuous change in the hydraulic brake force. A brake controller controls the hydraulic brake unit so that at least a predetermined fluid pressure is always supplied to a wheel cylinder while a brake operation is performed.

8 Claims, 5 Drawing Sheets

32 HYDRAULIC CONTROL MECHANISM

BRAKE FORCE CONTROL APPARATUS

BACKGROUND OF THE INVENTION

1. Field of the Invention

The present invention relates to a brake force control apparatus for a vehicle, and more particularly to a brake force control apparatus having a hydraulic braking unit and a regenerative braking unit.

2. Description of the Related Art

Conventionally, as disclosed in Japanese Laid-Open Patent Application No. 7-205800, a brake force control apparatus is known having a hydraulic braking unit and a regenerative braking unit. The hydraulic braking unit generates a hydraulic brake force corresponding to a friction force between a brake pad and a disk rotor by pressing the brake pad against the brake rotor in accordance with a wheel cylinder pressure. On the other hand, the regenerative braking unit generates a regenerative brake force corresponding to a regenerative energy generated in association with a rotation of a driving wheel driven by a motor. The hydraulic brake force and the regenerative brake force are controlled so that the sum thereof is equal to a brake force required by a driver (hereinafter referred to as a required brake force).

When the regenerative brake force is generated, a regenerative energy corresponding to the regenerative brake force is supplied to a battery as a charging current. Therefore, from a viewpoint of maintaining a charging state of the battery, the regenerative brake force is desired to be greater. On the other hand, the maximum regenerative brake force which can be generated by the regenerative braking unit is limited by the maximum regenerative energy which can be received by the battery and by a rotational speed of the driving wheel.

Thus, in the above-mentioned brake force control apparatus, when the maximum regenerative brake force is greater than or equal to the required brake force, the above-mentioned brake force control apparatus generates a regenerative brake force which is equal to the required brake force and sets the hydraulic brake force to be zero. On the other hand, when the maximum regenerative brake force is smaller than the required brake force, the apparatus generates a regenerative brake force which is equal to the maximum regenerative brake force and a hydraulic brake force which corresponds to the difference between the maximum regenerative brake force and the required brake force. In this way, it is possible to generate as large a regenerative brake force as possible.

As mentioned above, the hydraulic brake force is generated by a friction between the brake pad and the brake rotor. Thus, in a state where the hydraulic brake force is not generated, the brake pad and the brake rotor are not in contact with each other. On the other hand, in a state where the hydraulic brake force is generated, the brake pad and the brake rotor are in contact with each other. Accordingly, in the above-mentioned brake force control apparatus, when a relationship of magnitude between the maximum regenerative brake force and the required brake force changes during a brake operation, the hydraulic brake force is intermittently generated due to a transition between a state where the brake pad and the brake rotor are not in contact with each other and a state where the brake pad and the brake rotor are in contact with each other. In this case, when a transition occurs from the former state to the latter state, the hydraulic brake force is discontinuously increased so that a shock is generated in the vehicle and, as a result, the driver has an unnatural feeling.

Additionally, if a leak of brake fluid has occurred when the wheel cylinder pressure is increased, the wheel cylinder pressure becomes smaller than a target value. In this case, the leak of the brake force can be detected based on the change in the wheel cylinder pressure.

SUMMARY OF THE INVENTION

It is an object of the present invention to provide a brake force control apparatus which can prevent a driver from having the unnatural feeling due to a transition from a state where a brake pad and a brake rotor are not in contact with each other to a state where the brake pad and the brake rotor are in contact with each other during a brake operation.

It is another object of the present invention to detect a leak of brake fluid in the hydraulic braking unit at an early stage based on the change in the wheel cylinder pressure.

The above-mentioned objects of the present invention can be achieved by a brake force control apparatus having a hydraulic brake unit for generating a hydraulic brake force; a regenerative brake unit for generating a regenerative brake force; and a brake controller for controlling the hydraulic brake unit so that at least a predetermined fluid pressure is always supplied to a wheel cylinder while a brake operation is performed.

In the present invention, the wheel cylinder is always supplied with at least the predetermined fluid pressure while a brake operation is performed. When the fluid pressure is supplied to the wheel cylinder, a brake pad and a disk rotor of a brake system are in contact with each other. Thus, the brake pad and the disk rotor are always in contact with each other while a brake operation is performed, so that a transition is prevented between a state where the brake pad and the disk rotor are not in contact with each other and a state where they are in contact with each other. Accordingly, it is possible to prevent a driver of a vehicle from having an unnatural brake feeling due to a discontinuous change in the hydraulic brake force.

In the above brake force control apparatus, the brake controller may control the hydraulic brake unit so that a constant fluid pressure is supplied to the wheel cylinder when a maximum regenerative brake force which can be generated by the regenerative brake unit is greater than a required brake force, and a brake fluid leak detector may be provided for detecting a leak of brake fluid in the hydraulic brake unit based on a change in a wheel cylinder pressure.

In the present invention, the wheel cylinder is always supplied with a constant fluid pressure when the maximum regenerative brake force is greater than or equal to the required brake force. When a leak of brake fluid has occurred in a state where the constant fluid pressure is supplied to the wheel cylinder, the wheel cylinder pressure is decreased. The brake fluid leak detector detects the leak of brake fluid based on such a decrease in the wheel cylinder pressure. Thus, according to the present invention, it is possible to detect a leak of brake fluid at an early stage.

In the above brake force control apparatus, the brake controller may control the hydraulic brake unit so that a constant fluid pressure is supplied to the wheel cylinder when a maximum regenerative brake force which can be generated by the regenerative brake unit is greater than a required brake force, and a brake fluid leak detector may be provided for detecting a leak of brake fluid in the hydraulic brake unit based on an operation of said hydraulic brake unit to increase a wheel cylinder pressure.

In the present invention, the brake controller controls the hydraulic brake unit so that a constant fluid pressure is supplied to the wheel cylinder when the maximum regenerative brake force is greater than or equal to the required brake force. When a leak of brake fluid has occurred in a state where the constant fluid pressure is supplied to the wheel cylinder, the hydraulic brake unit operates to increase the wheel cylinder pressure so as to compensate a decrease thereof due to the leak of the brake fluid. The brake fluid detector detects the leak of brake fluid based on such an operation of the hydraulic brake unit to increase the wheel cylinder pressure. Thus, according to the present invention, it is possible to detect a leak of brake fluid at an early stage.

Other objects and further features of the present invention will be apparent from the following detailed description when read in conjunction with the accompanying drawings.

DESCRIPTION OF THE PREFERRED EMBODIMENTS

Figure 1:
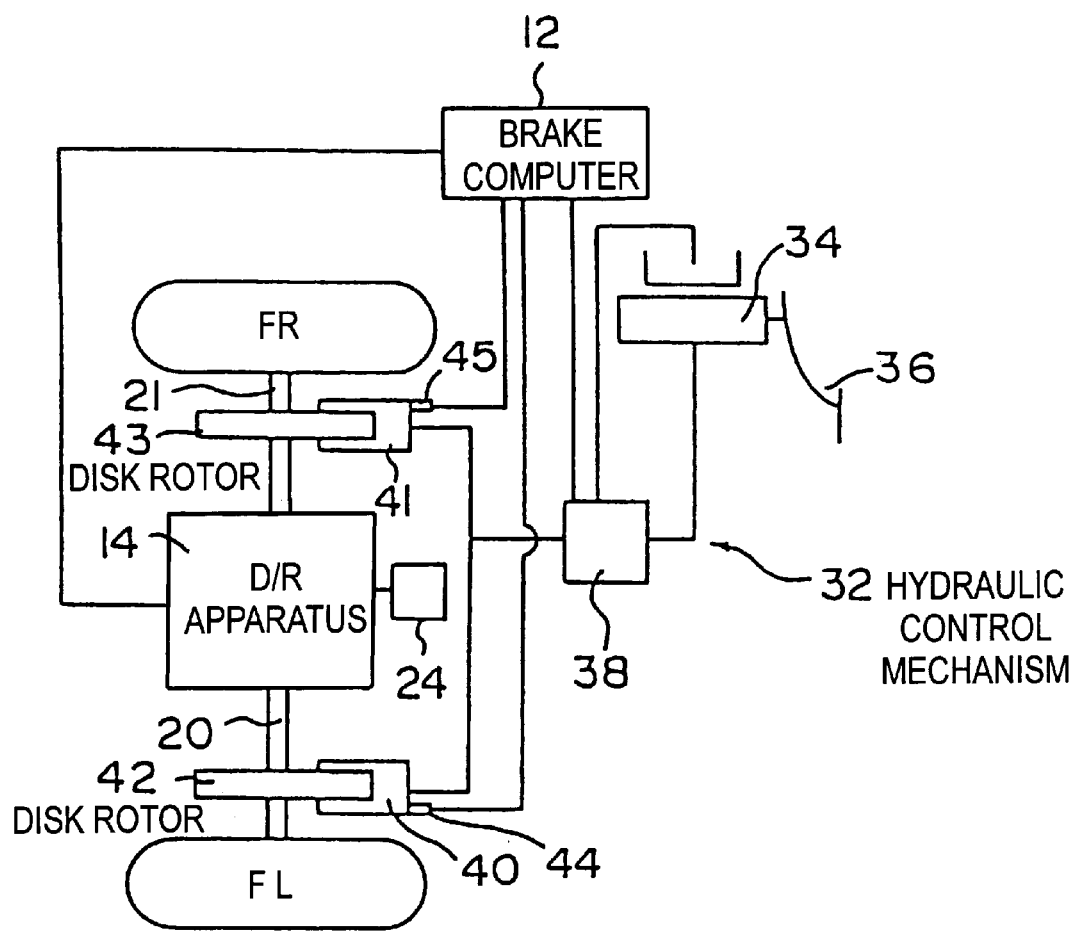
FIG. 1 is a system diagram of a brake force control apparatus of an embodiment of the present invention.

FIG. 1 shows a system diagram of a brake force control apparatus according to an embodiment of the present invention. The brake force control apparatus of the present embodiment includes a brake computer 12. A driving/regenerating (D/R) apparatus 14 is electrically connected to the brake computer 12.

The D/R apparatus 14 has a motor. In the system of the present embodiment, front left and right wheels FL, FR are driving wheels which are driven by the motor, and rear right and left wheels RR, RL are following wheels. In FIG. 1, only the driving wheels FL, FR are shown. A rotor of the motor is connected to the front left and right wheels FL, FR via drive shafts 20, 21. Thus, a driving force generated by the motor is transmitted to the left and right wheels FL, FR through the drive shafts 20, 21.

A battery 24 is electrically connected to the motor. The motor generates a driving torque in accordance with an electric power supplied from the battery 24, and generates a regenerative energy when a rotation torque is input from the driving shafts 20, 21. A magnetic field generator and a coil are provided inside the motor. The magnetic field generator generates a magnetic field in accordance with an operating signal supplied from the brake computer 12 to the motor. The coil rotates inside the magnetic field when the front right and left wheels FR, FL rotate.

The magnitude of the regenerative energy generated by the motor depends on the strength of the magnetic field generated by the magnetic field generator and the rotational speed of the coil, that is, rotational speed of the front left and right wheels FL, FR. Accordingly, the regenerative energy can be controlled in accordance with the operating signal supplied from the brake computer 12.

When the motor generates the regenerative energy, a regenerative torque is exerted on the FL, FR. The regenerative torque reduces the rotational speed of the FL and FR. That is, the regenerative torque generated by the motor is exerted on the FL, FR as a brake force. Hereinafter, the brake force generated in association with the regenerative torque is referred to as a regenerative brake force $F_G$.

The regenerative energy generated by the motor is supplied to the battery 24 as a charging current. Thus, the battery 24 is charged with a larger charging current as a larger regenerative torque is generated by the motor. The maximum value of the regenerative energy which can be received by the battery 24 is limited in accordance with the charging state of the battery 24. Additionally, the maximum value of the regenerative energy which can be generated by the motor is limited by the rotational speed of the FL, FR. Thus, the maximum value of the regenerative brake force $F_G$ is limited in accordance with the charging state of the battery 24 and the rotational speed of the FL, FR. Hereinafter, the maximum value of the regenerative brake force $F_G$ is referred to as a maximum regenerative brake force $F_G$MAX.

The brake force control apparatus of the present embodiment also includes a hydraulic control mechanism 32. The hydraulic control mechanism 32 has a master cylinder 34. A brake pedal 36 is connected to the master cylinder 34. The master cylinder 34 generates a fluid pressure corresponding to a depressing force applied to the brake pedal 36. Hereinafter, the fluid pressure generated by the master cylinder 36 is referred to as a master cylinder pressure $P_{M/C}$. A hydraulic actuator 38 is connected to the master cylinder 34. The hydraulic actuator 38 is electrically connected to the brake computer 12, and generates a brake fluid pressure in accordance with a control signal supplied from the brake computer 12. Wheel cylinders of the respective wheels are connected to the hydraulic actuator 38. Thus, each wheel cylinder is supplied with a fluid pressure corresponding to the brake fluid pressure generated by the hydraulic actuator 38.

The wheel cylinders actuate calipers 40, 41 with a force corresponding to the fluid pressure of the wheel cylinders (hereinafter referred to as wheel cylinder pressure $P_{W/C}$). When the calipers 40, 41 are actuated, brake pads provided to the calipers 40, 41 are pressed against braking surfaces of disk rotors 42, 43, respectively, with a force corresponding to the wheel cylinder pressure $P_{W/C}$. Accordingly, a brake force is exerted on each wheel in accordance with the control signal supplied to the hydraulic control mechanism 32 from the brake computer 12. Hereinafter, the brake force generated by the hydraulic control mechanism 32 is referred to as a hydraulic brake force $F_H$.

As mentioned above, in the system of the present embodiment, both the regenerative brake force $F_G$ generated by the D/R apparatus 14 and the hydraulic brake force $F_H$ generated by the hydraulic control mechanism 32 are exerted on the front left and right wheels FL, FR. Hereinafter, the sum of the regenerative brake force $F_G$ and the hydraulic brake force $F_H$ is referred to as a total brake force $F_{ALL}$. On the other hand, only the hydraulic brake force $F_H$ is exerted on the rear left and right wheels RL, RR.

The hydraulic actuator 38 has a pressure sensor for sensing the master cylinder pressure $P_{M/C}$. The output signal of the pressure sensor is supplied to the brake computer 12. The brake computer 12 calculates a brake force which is to be generated in a vehicle, that is, the required brake force $F_{REQ}$, based on the output signal of the pressure sensor. The brake computer 12 appropriately distributes the required brake force $F_{REQ}$ to the regenerative brake force $F_G$ and the hydraulic brake force $F_H$, and controls the D/R apparatus 14 and the hydraulic control mechanism 32 so that the desired regenerative brake force $F_G$ and hydraulic brake force $F_H$ are generated.

Figure 2:
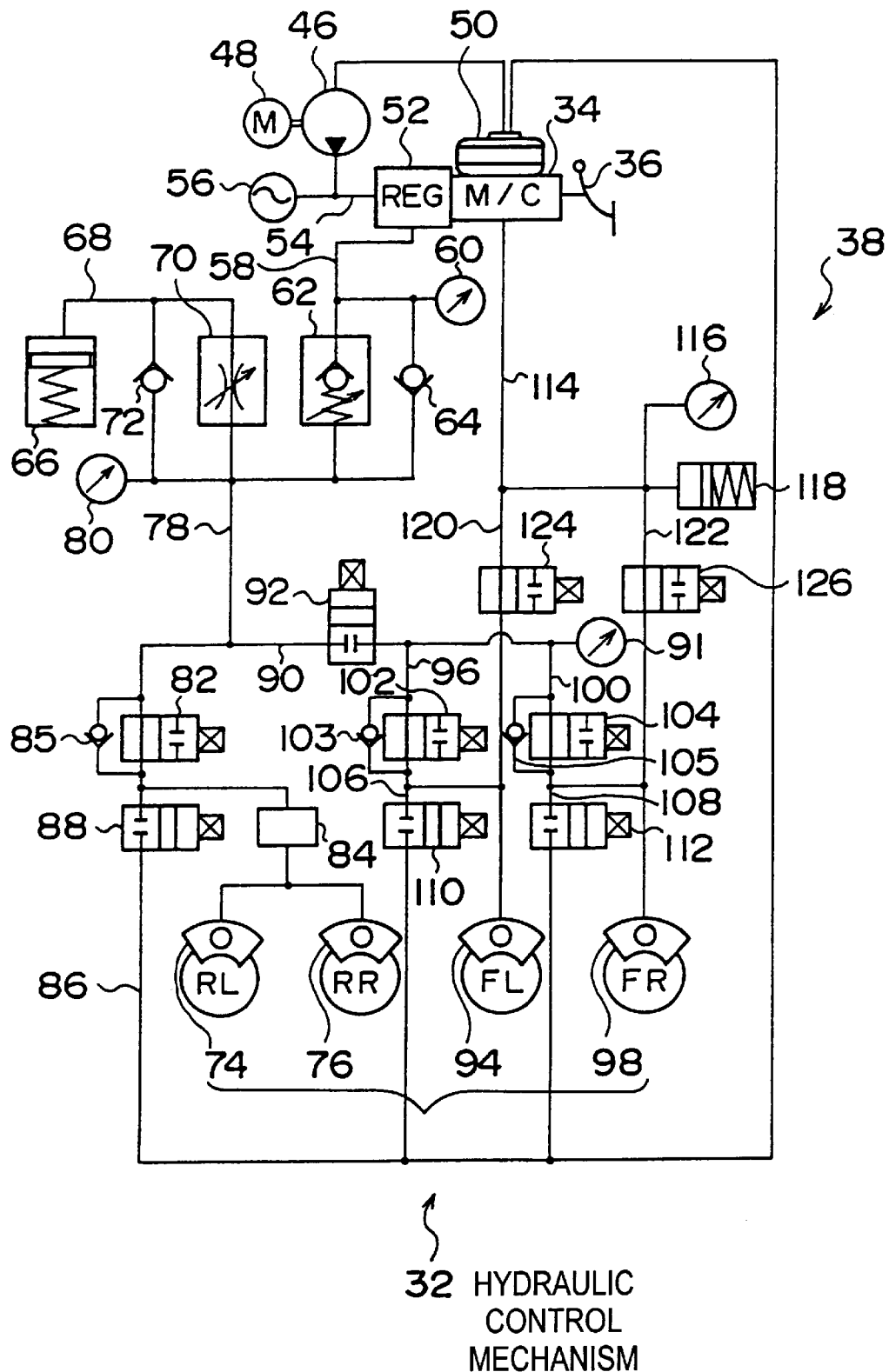
FIG. 2 is a system diagram of a hydraulic control mechanism of the present embodiment.

Now a description will be given of the construction of the hydraulic control mechanism 32 with reference to FIG. 2. FIG. 2 is a system diagram of the hydraulic control mechanism 32. As shown in FIG. 2, the hydraulic control mechanism 32 includes a pump 46. The pump 46 is driven by a pump motor 48. An inlet of the pump 46 is connected to a reservoir tank 50. On the other hand, an outlet of the pump 46 is connected to a high pressure passage 54, which is in turn connected to a regulator 52. An accumulator 56 is connected to the high pressure passage 54. The accumulator 56 stores brake fluid delivered by the pump 46.

A main fluid pressure passage 58 is connected to the regulator 52. The regulator 52 generates a predetermined regulator pressure PRE by reducing the fluid pressure of the accumulator 56, and delivers the regulator pressure PRE to the main fluid pressure passage 58.

A fluid pressure sensor 60 for sensing the regulator pressure PRE is provided to the main fluid pressure passage 58. The output signal of the fluid pressure sensor 60 is supplied to the brake computer 12. The brake computer 12 detects the regulator pressure PRE based on the output signal of the fluid pressure sensor 60.

A linear addition solenoid valve 62 (SLA 62) is also provided to the main fluid pressure passage 58. The SLA 62 is a linear control valve which controls the amount of brake fluid passing though the main fluid pressure passage 58. The SLA 62 changes its opening in accordance with an operating signal supplied from the brake computer 12. A check valve 64 is provided to the main fluid pressure passage 58 in parallel with the SLA 62. The check valve 64 allows only a flow of brake fluid from a downstream side of the SLA 62 to the regulator 52.

A downstream side of the SLA 62 is connected to a pressure decreasing passage 68, which in turn connected to a supplementary reservoir tank 66. A linear reduction solenoid valve 70 (SLR 70) is provided to the pressure decreasing passage 68. The SLR 70 is a linear control valve which controls the amount of brake fluid passing through the pressure decreasing passage 68. The SLR 70 changes its opening in accordance with an operating signal supplied from the brake computer 12. A check valve 72 is provided to the pressure decreasing passage 68 in parallel with the SLR 70. The check valve 72 allows only a flow of brake fluid from the supplementary reservoir tank 66 to the main fluid pressure passage 58.

The downstream side of the SLA 62 is also connected to a rear fluid pressure passage 78, which is in turn connected to wheel cylinders 74, 76 provided to the rear wheels RL, RR. A fluid pressure sensor 80 is provided to the rear fluid pressure passage 78. The fluid pressure sensor 80 senses a fluid pressure in the rear fluid pressure passage 78, that is, a rear brake fluid pressure PR. The output signal of the fluid pressure sensor 80 is supplied to the brake computer 12. The brake computer 12 detects the rear brake fluid pressure PR based on the output signal of the fluid pressure sensor 80.

The SLA 62 reduces the regulator pressure PRE with a ratio corresponding to the operating signal supplied from the brake computer 12. Thus, the rear brake fluid pressure PR is increased in accordance with the operating signal. On the other hand, the SLR 70 changes the amount of brake fluid flowing from the rear fluid pressure passage 78 to the supplementary reservoir tank 66 in accordance with the operating signal supplied from the brake computer 12. Thus, the rear brake fluid pressure PR is decreased in accordance with the operating signal.

A rear wheel holding solenoid valve 82 (SRH 82) and a proportioning valve 84 are provided to the rear fluid pressure passage 78. The SRH 82 is a two-position solenoid valve which normally remains in an open state and changes to a closed state when an ON signal is supplied thereto from the brake computer 12. A check valve 85 is provided in parallel with the SRH 82. The check valve 85 allows only a flow of brake fluid from the wheel cylinders 74, 76 to the main fluid pressure passage 58. The proportioning valve 84 directly delivers the rear brake fluid pressure PR to the wheel cylinders 74, 76 when the PR is lower than a predetermined value, and reduces the rear brake fluid pressure PR with a predetermined ratio and delivers it to the wheel cylinders 74, 76 when the PR is higher than the predetermined value.

A rear fluid pressure decreasing passage 86 is connected to a portion of the rear fluid pressure passage 78 between the SRH 82 and the proportioning valve 84. A rear wheel pressure decreasing solenoid valve 88 (SRR 88) is provided to the rear fluid pressure decreasing passage 86. The SRR 88 is a two-position solenoid valve which normally remains in a closed state and changes to an open state when an ON signal is supplied thereto from the brake computer 12.

A front fluid pressure passage 90 is connected to an upstream side of the SRH82. A switching solenoid valve 92 (SS 92) is provided to the front fluid pressure passage 90. The SS 92 is a two-position solenoid valve which normally remains in a closed state and changes to an open state when an ON signal is supplied thereto from the brake computer 12.

A fluid pressure sensor 91 is provided to a downstream side of the SS 92. The fluid pressure sensor 91 senses a fluid pressure in the front fluid pressure passage 90, that is, a front brake fluid pressure PF. The output signal of the fluid pressure sensor 91 is supplied to the brake computer 12. The brake computer 12 detects the front brake fluid pressure PF based on the output signal of the fluid pressure sensor 91.

The front fluid pressure passage 90 is connected to a front left fluid pressure passage 96 and a front right fluid pressure passage 100 at a downstream side of the SS 92. The front left fluid pressure passage 96 is connected to a wheel cylinder 94 of the front left wheel FL, and the front right fluid pressure passage 100 is connected to a wheel cylinder 98 of the front right wheel FR. A front left holding solenoid valve 102 (SFLH 102) and a front right holding solenoid valve 104 (SFRH 104) are provided to the front left fluid pressure passage 96 and the front right fluid pressure passage 100, respectively. The SFLH 102 and the SFRH 104 are two-position solenoid valves which normally remain in an open state and change to a closed state when an ON signal is supplied thereto from the brake computer 12. Check valves 103 and 105 are provided in parallel with the SFLH 102 and the SFRH 104, respectively. The check valves 103 and 105 allow only a flow of brake fluid from the wheel cylinders 94, 98 to the front fluid pressure passage 90.

A front left pressure decreasing passage 106 is connected to a portion of the front left fluid pressure passage 96 between the SFLH 102 and the wheel cylinder 94. Similarly, a front right fluid pressure decreasing passage 108 is connected to a portion of the front right fluid pressure passage 100 between the SFRH 104 and the wheel cylinder 98. Both the front left pressure decreasing passage 106 and the front right pressure decreasing passage 108 are connected to the reservoir tank 50. A front left pressure decreasing solenoid valve 110 (SFLR 110) and a front right pressure decreasing solenoid valve 112 (SFRR 112) are provided to the front left pressure decreasing passage 106 and the front right pressure decreasing passage 108, respectively. The SFLR 110 and the SFRR 112 are two-position solenoid valves which normally remain in a closed state and change to an open state when an ON signal is supplied thereto from the brake computer 12.

A master pressure passage 114 is connected to the master cylinder 34. A fluid pressure sensor 116 for sensing the master cylinder pressure $P_{M/C}$ is provided to the master pressure passage 114. The output signal of the fluid pressure sensor 116 is supplied to the brake computer 12. The brake computer 12 detects the master cylinder pressure $P_{M/C}$ based on the output signal of the fluid pressure sensor 116. Additionally, a stroke simulator 118 is connected to the master pressure passage 114.

The master pressure passage 114 is connected to a front left master pressure passage 120 and a front right master pressure passage 122, which are in turn connected to the wheel cylinders 94 and 98 of the front left and right wheels FL, FR, respectively. A first master cylinder cut solenoid valve 124 (SMC-1 124) and a second master cylinder cut solenoid valve 126 (SMC-2 126) are provided to the front left master pressure passage 120 and the front right master pressure passage 122, respectively. The SMC-1 124 and the SMC-2 126 are two-position solenoid valves which normally remain in an open state and change to a closed state when an ON signal is supplied thereto from the brake computer 12.

When no abnormality has occurred in the system of the present embodiment, the SMC-1 124 and the SMC-2 126 are changed to a closed state at the same time the brake pedal 36 is depressed. In this case, since the master cylinder pressure $P_{M/C}$ is increased by the brake pedal 36 being depressed, brake fluid flows from the master cylinder 34 to the stroke simulator 118. When the depression of the brake pedal 36 is released, the master cylinder pressure $P_{M/C}$ is decreased accordingly. In this case, the brake fluid flows from the stroke simulator 118 to the master cylinder 34. Thus, the stroke simulator 118 can generate a stroke of the brake pedal 36 corresponding to the pedal depressing force in a situation where both the SMC-1 124 and the SMC-2 126 are closed.

When an abnormality is detected in the system, both the SMC-1 124 and the SMC-2 126 are changed to an open state. In this case, since the wheel cylinders 94, 98 are connected to the master cylinder 34, the wheel cylinder pressure $P_{W/C}$ of the wheel cylinders 94, 98 are positively increased toward the master cylinder pressure $P_{M/C}$ as an upper limit. Hereinafter, the wheel cylinders 74, 76, 94, 98 may be generally referred to as wheel cylinders with the reference numerals being omitted.

In a case of a normal brake operation where the brake pedal 36 is depressed and a tendency of lock is not detected in any of the wheels, the SRH 82, the SRR 88, the SFLH 102, the SFRH 104, the SFLR 110, and the SFRR 112 are turned off and the SS 92, the SMC-1 124, and the SMC-2 126 are turned on. Hereinafter, this state is referred to as a normal brake state.

In the normal brake state, each of the rear fluid pressure passage 78, the front wheel fluid pressure passage 90, the front left wheel fluid pressure passage 96, and the front right fluid pressure passage 100 is in continuity. Thus, the rear brake fluid pressure PR is supplied to the wheel cylinders 74, 76 of the rear wheels through the proportioning valve 84 and the front brake fluid pressure PF is directly supplied to the wheel cylinders 94, 98 of the front wheels. As mentioned above, the rear wheel brake pressure PR is increased in accordance with the opening of the SLA 62. The front brake fluid pressure PF is slightly different from the rear brake fluid pressure PR in a rising speed due to the presence of the SS 92, although these fluid pressures are substantially equal to each other. Thus, a desired fluid pressure can be supplied to each wheel cylinder by controlling the opening of the SLA 62 based on the rear brake fluid pressure PR and the front brake fluid pressure PF.

In the present embodiment, the opening of the SLA 62 is controlled in accordance with a duty ratio of the control signal supplied thereto from the brake computer 12. That is, the opening of the SLA 62 is increased as a ratio of ON time in the duty control (ON time ratio $T_{ON}$) becomes larger and is decreased as the ON time ratio $T_{ON}$ becomes smaller. When the opening of the SLA 62 is increased, a higher fluid pressure is supplied to the wheel cylinders accordingly.

When a tendency of lock is detected in any of the wheels, an ABS control is started for that wheel. For example, when a tendency of lock is detected in the front left wheel FL, the ABS control is started for the front left wheel FL by fully opening the SLA 62. The ABS control for the front left wheel FL is achieved by operating the SFLH 102 and the SFLR 110 in the normal brake state.

When the SFLH 102 is opened and the SFLR 110 is closed, the wheel cylinder 94 is connected to the main fluid pressure passage 78. In this case, the fluid pressure in the wheel cylinder 94 is increased toward the rear brake fluid pressure PR. Hereinafter, this state is referred to as a pressurizing mode.

When the SFLH 102 is closed and the SFLR 110 is opened in the normal brake state, the wheel cylinder 94 is connected to the reservoir tank 50. In this case, brake fluid flows from the wheel cylinder 94 to the reservoir tank 50 so that the fluid pressure in the wheel cylinder 94 is decreased. Hereinafter, this state is referred to as a pressure decreasing mode.

When both the SFLH 102 and SFLR 110 are closed, the fluid pressure in the wheel cylinder 94 is maintained. Hereinafter, this state is referred to as a holding mode.

The ABS control for the front left wheel FL is performed by appropriately achieving the above-mentioned pressurizing mode, pressure decreasing mode, and holding mode so that a slip rate of each wheel is maintained below a predetermined value. Similarly, the ABS control for the front right wheel FR is performed by operating the SFRH 104 and the SFRR 112 so that the pressurizing mode, the pressure decreasing mode, and the holding mode are appropriately achieved. The ABS control for the rear left and right wheels RL, RR is performed in common by operating the SRH 82 and the SRR 88.

As mentioned above, in the brake force control apparatus of the present embodiment, the total brake force $F_{ALL}$, which is a sum of the regenerative brake force $F_G$ generated by the D/R apparatus 14 and the hydraulic brake force $F_H$ generated by the hydraulic control mechanism 32, is generated in the vehicle. When the regenerative brake force $F_G$ is generated, a regenerative energy corresponding thereto is supplied to the battery 24. In this case, a fuel economy is improved as a larger regenerative energy is supplied to the battery 24. Accordingly, in order to improve the fuel economy of the vehicle, it is desirable to generate as large a regenerative brake force $F_G$ as possible, with the maximum regenerative brake force $F_{GMAX}$ being the upper limit.

From the above-mentioned point of view, it may be advantageous to control the regenerative brake force $F_G$ and the hydraulic brake force $F_H$ in the following manner. That is, when the maximum regenerative brake force $F_{GMAX}$ is greater than or equal to the required brake force $F_{REQ}$, a regenerative brake force $F_G$ which is equal to the required brake force $F_{REQ}$ is generated and the hydraulic brake force $F_H$ is set to be zero. On the other hand, when the maximum regenerative brake force $F_{GMAX}$ is smaller than the required brake force $F_{REQ}$, a regenerative brake force $F_G$ which is equal to the maximum regenerative brake force $F_{GMAX}$ and a hydraulic brake force $F_H$ which corresponds to the difference between the required brake force $F_{REQ}$ and the maximum regenerative brake force $F_{GMAX}$ are generated. However, this approach involves the following problems.

As described above, the hydraulic brake force $F_H$ is generated by pressing the brake pads of the calipers 40, 41 against the disk rotors 42, 43 with a force corresponding to the wheel cylinder pressure $P_{W/C}$. Therefore, if the hydraulic brake force $F_H$ is generated only when the maximum regenerative brake force $F_{GMAX}$ is smaller than the required brake force $F_{REQ}$ according to the above-mentioned approach, a transition occurs between a state where the brake pads and the disk rotors 42, 43 are in contact with each other and a state where they are not in contact with each other, when a relationship of magnitude between the required brake force $F_{REQ}$ and the maximum regenerative brake force $F_{GMAX}$ changes. In this case, when a transition occurs from a state where the brake pads and the disk rotors 42, 43 are in contact with each other to a state where they are not in contact with each other (that is, when a transition occurs from a state where the hydraulic brake force $F_H$ is not generated to a state where the hydraulic brake force $F_H$ is generated), a shock is generated in the vehicle due to a discontinuous increase in the hydraulic brake force $F_H$, and, as a result, the driver may have an unnatural feeling. Accordingly, in order to prevent such an unnatural feeling of the driver, it is required to avoid the discontinuous change in the hydraulic brake force $F_H$.

Additionally, in the normal brake state of the hydraulic control mechanism 32 of the present embodiment, the wheel cylinders 74, 76, 94, 98 are connected with one another. Thus, if a leak of brake fluid occurs in a brake piping system of the hydraulic control mechanism 32 corresponding to any one of the wheels, the wheel cylinder pressure $P_{W/C}$ of each wheel is decreased. For this reason, it is required to detect the leak of brake fluid as early as possible.

In a case where the hydraulic brake force $F_H$ is generated, that is, in a case where the wheel cylinders are supplied with a fluid pressure which is greater than an atmospheric pressure, the wheel cylinder pressure $P_{W/C}$ becomes smaller than the fluid pressure supplied to the wheel cylinders if a leak of brake fluid has occurred in the hydraulic control mechanism 32. In this case, the leak of brake fluid can be detected based on the change in the wheel cylinder pressure $P_{W/C}$.

The brake force control apparatus of the present embodiment can satisfy the above-mentioned requirements by always supplying each wheel cylinder with at least a predetermined fluid pressure $P_0$ during a brake operation, so that a hydraulic brake force $F_H$ which is greater than or equal to a predetermined value is always generated. It should be noted that the fluid pressure supplied to the wheel cylinders can be controlled by changing the opening of the SLA 62 based on the rear brake fluid pressure PR and the front wheel brake fluid pressure PF, as described above.

Figure 3:
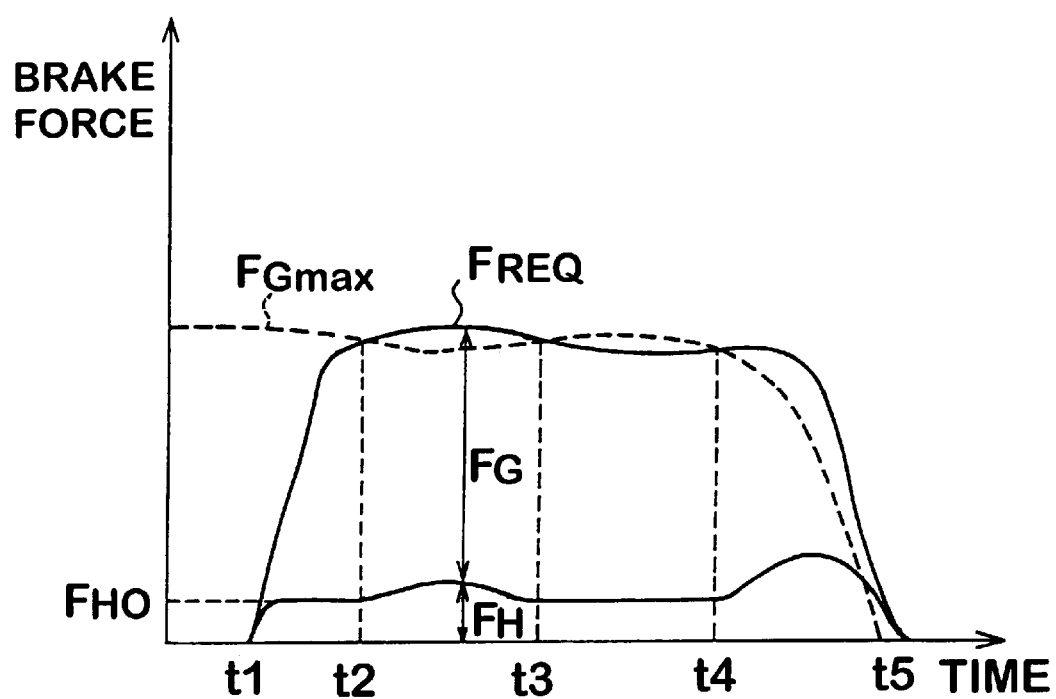
FIG. 3 is a time chart illustrating changes in a distribution of a required brake force $F_{REQ}$ to a hydraulic brake force $F_H$ and a regenerative brake force $F_G$, and changes in a maximum regenerative brake force $F_{GMAX}$.

FIG. 3 is a time chart showing an example of changes in a distribution of the required brake force $F_{REQ}$ to the hydraulic brake force $F_H$ and the regenerative brake force $F_G$ and changes in the maximum regenerative brake force $F_{GMAX}$, achieved in the brake force control apparatus of the present embodiment.

In FIG. 3, a brake operation is started at a time t1 and the required brake force $F_{REQ}$ starts being rapidly increased. Until the required brake force $F_{REQ}$ exceeds the maximum regenerative brake force $F_{GMAX}$ at a time t2, the predetermined fluid pressure $P_0$ is supplied to the wheel cylinders, and thus a hydraulic brake force $F_{H0}$ corresponding to the fluid pressure $P_0$ is generated. At the same time, a regenerative brake force $F_G$ corresponding to the difference between the required brake force $F_{REQ}$ and the hydraulic brake force $F_{H0}$ is generated so that the total brake force $F_{ALL}$ is equal to the required brake force $F_{REQ}$.

During a period after the time t2 until a time t3, the required brake force $F_{REQ}$ is greater than the maximum regenerative brake force $F_{GMAX}$. During this period, the hydraulic brake force $F_H$ is increased by a value corresponding to the difference between $F_{GMAX}$ and $F_{REQ}$ so that the total brake force $F_{ALL}$ is maintained to be equal to the required brake force $F_{REQ}$.

In association with the brake operation, a velocity of the vehicle is decreased so that the maximum regenerative brake force $F_{GMAX}$ becomes limited by the rotational speed of the driving wheels FL, FR. Accordingly, the maximum regenerative brake force $F_{GMAX}$ starts being decreased near the end of the brake operation and becomes smaller than the required brake force $F_{REQ}$ after a time t4. In such a situation, the hydraulic brake force $F_H$ is increased so that the difference between the maximum regenerative brake force $F_{GMAX}$ and the required brake force $F_{REQ}$ is compensated. Finally, when the brake operation is ended at a time t5 after the vehicle has stopped, the hydraulic brake force $F_H$ is set to zero, since the required brake force $F_{req}$ becomes zero with the brake operation having been ended.

As described above, according to the present embodiment, a fluid pressure which is greater than or equal to the predetermined fluid pressure $P_0$ is always supplied to the wheel cylinders during a brake operation. Therefore, no transition occurs between a state where the brake pads and the disk rotors 42, 43 are not in contact with each other and a state where they are in contact with each other if the relationship between the maximum regenerative brake force $F_{GMAX}$ and the required brake force $F_{REQ}$ changes. Thus, according to the brake force control apparatus of the present embodiment, it is possible to prevent the driver of the vehicle from having the unnatural feeling due to the discontinuous change in the hydraulic brake force.

Additionally, in the present embodiment, the brake pads and the disk rotors 42, 43 are always in contact with each other during a brake operation, and therefore, rusts generated on the braking surfaces of the disk rotors 42, 43 can be rubbed off by the brake pads and the braking surfaces can be maintained in a stable condition. Thus, according to the brake force control apparatus of the present embodiment, it is possible to achieve a stable friction between the brake pads and the disk rotors 42, 43, thereby generating a stable hydraulic brake force $F_H$.

Further, in the present embodiment, when the maximum regenerative brake force $F_{GMAX}$ is greater than the required brake force $F_{REQ}$ (during the periods (t1, t2) and (t3, t4) in FIG. 3), the wheel cylinders are supplied with the predetermined fluid pressure $P_0$. If a leak of brake fluid has occurred in the hydraulic control mechanism 32 in such a state, the wheel cylinder pressure $P_{W/C}$ is decreased from the predetermined fluid pressure $P_0$. Therefore, if the wheel cylinder pressure $P_{W/C}$ becomes smaller than the predetermined fluid pressure $P_0$ in the state where the maximum regenerative brake force $F_{GMAX}$ is greater than the required brake force $F_{REQ}$, it can be determined that a leak of brake fluid has occurred. Thus, according to the brake force control apparatus of the present embodiment, a leak of brake fluid can be detected at an early stage.

It should be noted that the wheel cylinder pressure $P_{W/C}$ can be detected based on the output signals of the fluid pressure sensors 80 and 91, since the wheel cylinder pressure $P_{W/C}$ substantially corresponds to the rear brake fluid pressure PR and the front wheel brake fluid pressure PF.

Additionally, since the wheel cylinders 74, 76, 94, 98 are connected with one another in the normal brake state, the wheel cylinder pressure $P_{W/C}$ of each wheel may not be sufficiently increased if a leak of brake fluid has occurred for any one of the wheels. For this reason, in the present embodiment, when a leak of brake fluid is detected, the SS 92 is turned off (closed), the SMC-1 124 and the SMC-2 126 are turned off (opened) and the SLA 62 is fully opened.

In this state, the wheel cylinders 74, 76 of the rear wheels are connected to the regulator 52 and the wheel cylinders 94, 98 are connected to the master cylinder 34, with the wheel cylinders 74, 76 and the wheel cylinders 94, 98 being disconnected from each other. If a leak of brake fluid has occurred in one of the rear and front brake piping systems in this state, the wheel cylinder pressure $P_{W/C}$ for the other brake piping system can be increased using the regulator 52 or the master cylinder 34 as a fluid pressure source. Thus, according to the brake force control apparatus of the present embodiment, it is possible to maintain the hydraulic brake force $F_H$ as a whole if a leak of brake fluid has occurred in the hydraulic control mechanism 32.

The above-mentioned predetermined fluid pressure $P_0$ is set so that, on one hand, the change in the wheel cylinder pressure $P_{W/C}$ can be reliably detected, and on the other hand, the regenerative brake force $F_G$ is not considerably reduced.

Figure 4:
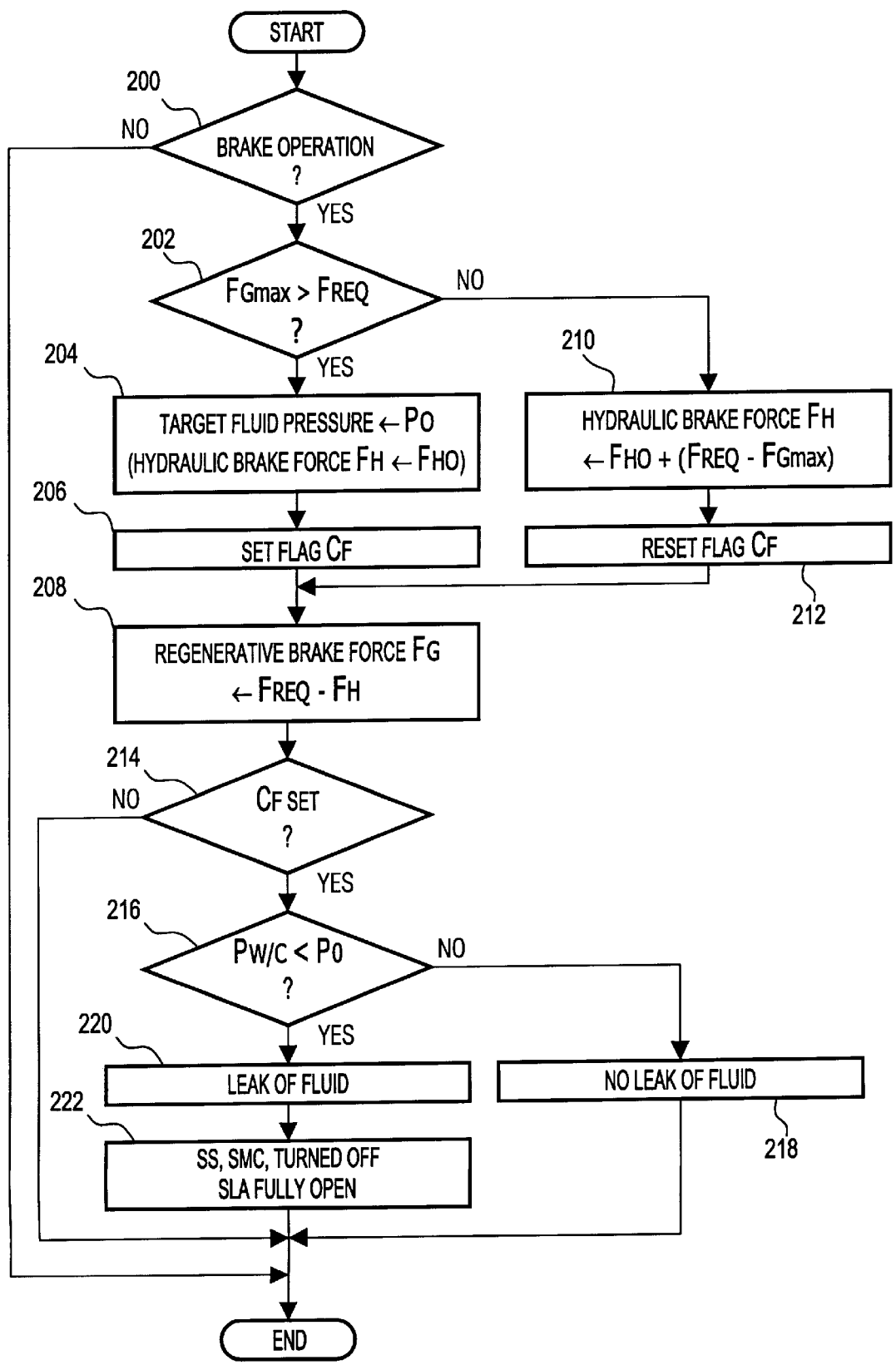
FIG. 4 is a flowchart of a routine performed by a brake computer in the present embodiment.

The above-mentioned function of the brake force control apparatus of the present embodiment is achieved by the brake computer 12 performing a predetermined routine. Now, a description will be given of a process performed by the brake computer 12 in the present embodiment with reference to FIG. 4. FIG. 4 is a flowchart of a routine performed by the brake computer 12.

When the routine shown in FIG. 4 is started, the process of step 200 is performed first. In step 200, it is determined whether or not a brake operation is being performed, that is, whether or not the brake pedal 36 is being depressed. Such a determination can be carried out based on a state of a brake switch provided near the brake pedal 36 or based on the master cylinder pressure $P_{M/C}$ detected by the fluid pressure sensor 116. If it is determined that a brake operation is not being performed in step 200, no further process is performed thereafter and the present routine is ended. On the other hand, if it is determined that a brake operation is being performed in step 200, then the process of step 202 is performed.

In step 202, it is determined whether or not the maximum regenerative brake force $F_{GMAX}$ is greater than the required brake force $F_{REQ}$. If $F_{GMAX}$ is greater than $F_{REQ}$, then the process of step 204 is performed. In step 204, the predetermined fluid pressure $P_0$ is supplied to the wheel cylinders. As described above, the hydraulic brake force $F_{H0}$ is generated when the predetermined fluid pressure $P_0$ is supplied to the wheel cylinders. When the process of step 204 is finished, a flag CF is set in step 206, and then the process of step 208 is performed. The flag CF is a flag which indicates that the predetermined fluid pressure $P_0$ is being supplied to the wheel cylinders when it is set.

On the other hand, if it is determined that the $F_{GMAX}$ is not greater than $F_{REQ}$ in step 202, then, in step 210, the wheel cylinder pressure $P_{W/C}$ is controlled so that the hydraulic brake force $F_H$ is equal to $(F_{H0}+(F_{REQ}-F_{GMAX}))$. When the process of step 210 is finished, the flag CF is reset in step 212, and then the process of step 208 is performed.

In step 208, a regenerative brake force $F_G$ which is equal to $(F_{REQ}-F_H)$ is generated. According to this process, the total brake force $F_{ALL}$ (=hydraulic brake force $F_H$+regenerative brake force $F_G$) is set to be equal to the required brake force $F_{REQ}$. When the process of step 208 is finished, the process of step 214 is performed.

In step 214, it is determined whether or not the flag CF is set. If the flag CF is set, it is determined that the predetermined fluid pressure $P_0$ is being supplied to the wheel cylinders and then the process of step 216 is performed. On the other hand, if the flag is not set to ON in step 214, the present routine is ended.

In step 216, it is determined whether or not the wheel cylinder pressure $P_{W/C}$ is smaller than the predetermined fluid pressure $P_0$. If $P_{W/C}$ is not smaller than $P_0$, it is determined that no leak of brake fluid has occurred. In this case, a signal to that effect is output in step 218, and the present routine is ended. On the other hand, if $P_{W/C}$ is smaller than $P_0$ in step 216, it is determined that a leak of brake fluid has occurred. In this case, a signal to that effect is output in step 220 and then the process of step 222 is performed.

In step 222, the SS 92 is turned off (closed), SMC-1 124 and SMC-2 126 are turned off (opened), and the SLA 62 is fully opened. When such a process is performed, the wheel cylinder pressure $P_{W/C}$ for the rear wheels or the front wheels can be increased by using the regulator 52 or the master cylinder 34 as a fluid pressure source, as described above. When the process of step 222 is finished, the present routine is ended.

In the above-mentioned embodiment, when the maximum regenerative brake force $F_{GMAX}$ is greater than the required brake force $F_{REQ}$, the opening of the SLA 62 is controlled so that the predetermined fluid pressure $P_0$ is always supplied to the wheel cylinders. However, the opening of the SLA 62 may be maintained constant or fully closed after the wheel cylinder pressure $P_{W/C}$ has increased to the predetermined fluid pressure $P_0$, so that the wheel cylinder pressure $P_{W/C}$ is maintained to be equal to $P_0$. In this case, the wheel cylinder pressure $P_{W/C}$ is decreased when only a slight leak of brake fluid has occurred. Thus, it is possible to sensitively detect the leak of brake fluid.

Now a description will be given of a second embodiment of the present invention. The brake force control apparatus of the present embodiment is achieved by the brake computer 12 performing the routine shown in FIG. 5 in the system shown in FIGS. 1 and 2.

As mentioned above, in the system shown in FIGS. 1 and 2, the duty ratio of the control signal supplied to the SLA 62 is controlled so that the predetermined fluid pressure $P_0$ is supplied to the wheel cylinders when the maximum regenerative brake force $F_{GMAX}$ is greater than the required brake force $F_{REQ}$. Thus, when a leak of brake fluid has occurred in the hydraulic control mechanism 32, the ON time ratio $T_{ON}$ of the duty ratio is increased so as to compensate a decrease in the wheel cylinder pressure $P_{W/C}$ generated due to the leak of brake fluid. In the present embodiment, a leak of brake fluid is detected based on such a change in the duty ratio.

Now, a description will be given of the contents of the routine shown in FIG. 5. In the routine shown FIG. 5, steps corresponding to the steps of the routine shown in FIG. 4 are given the same numerals and descriptions thereof will be omitted.

Figure 5:
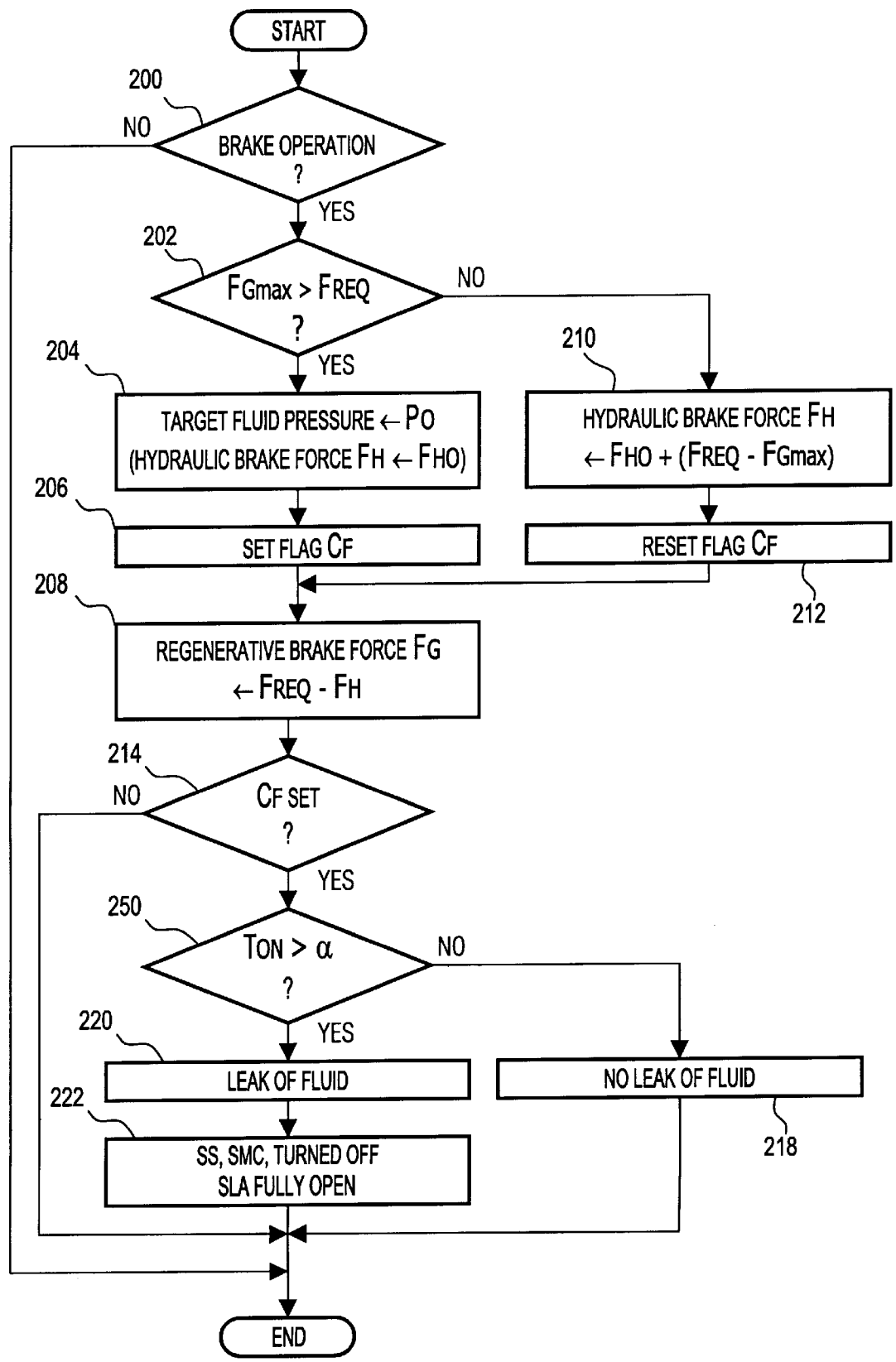
FIG. 5 is a flowchart of a routine performed by the brake computer in a second embodiment of the present invention.

In the routine shown in FIG. 5, if it is determined that the flag CF is set in step 214, the process of step 250 is performed. In step 250, it is determined whether or not the ON time ratio $T_{ON}$ is greater than a predetermined value α. If $T_{ON}$ is greater than α, it is determined that $T_{ON}$ has been increased so as to compensate a decrease in the wheel cylinder pressure $P_{W/C}$. In this case, it is determined that a leak of brake fluid has occurred, and the process of step 220 is performed. On the other hand, if $T_{ON}$ is not greater than α, it is determined that no leak of brake fluid has occurred, and the process of step 218 is performed.

In the above-mentioned first and second embodiments, the operating signal supplied to the SLA 62 is duty controlled. However, the amplitude of the operating signal may be linearly controlled. In this case, the determination process in step 250 of the routine of the second embodiment shown in FIG. 5 may be performed by determining whether or not the operating signal supplied to the SLA 62 is greater than a predetermined value.

Additionally, in the first and second embodiments, the wheel cylinder pressure $P_{W/C}$ is linearly controlled by the SLA 62 which is constructed as a linear control valve. However, a two-position solenoid valve may be provided instead of the SLA 62. In this case, the wheel cylinder pressure $P_{W/C}$ is controlled by switching the state of the two-position valve.

Further, in the first and second embodiments, the present invention is applied to a disk brake system which generates a brake force by a friction between the brake pads and the disk rotors 42, 43. However, the present invention can also be applied to a drum brake system which generates a brake force by a friction between a brake shoe and a brake drum.

Additionally, in the first and second embodiments, descriptions are given of a case where the brake pads and the disk rotors are in contact with each other when the hydraulic brake force is generated and the brake pads and the disk rotors are not in contact with each other when the hydraulic brake force is not generated. However, in some type of hydraulic braking unit, the brake pads and the disk rotors are slightly in contact with each other even in a state where the wheel cylinder pressure is not increased. In this state, no hydraulic brake force is substantially generated. Thus, when the hydraulic braking unit starts to increase the wheel cylinder pressure in the state, the hydraulic brake force is discontinuously increased. According to the present invention, the hydraulic brake force which is greater than a predetermined value is always generated, and therefore the discontinuous change in the hydraulic brake force is avoided so that a braking feeling is improved in the above-mentioned type of hydraulic braking unit.

Further, the present invention is not limited to these embodiments, but variations and modifications may be made without departing from the scope of the present invention.

The present application is based on Japanese priority application No. 9-215016 filed on Aug. 8, 1997, the entire contents of which are hereby incorporated by reference.

What is claimed is:

1. A brake force control apparatus comprising:
   a hydraulic brake unit for generating a hydraulic brake force;
   a regenerative brake unit for generating a regenerative brake force; and
   a brake controller for controlling said hydraulic brake unit so that at least a predetermined positive fluid pressure is always supplied to a wheel cylinder while a brake operation is performed.

2. The brake force control apparatus as claimed in claim 1, wherein:
   said brake controller controls said hydraulic brake unit so that a constant fluid pressure is supplied to the wheel cylinder when a required brake force is less than a maximum regenerative brake force which can be generated by said regenerative brake unit, and
   a brake fluid leak detector is provided for detecting a leak of brake fluid in said hydraulic brake unit based on a change in a wheel cylinder pressure.

3. The brake force control apparatus as claimed in claim 1, wherein:
   said brake controller controls said hydraulic brake unit so that a constant fluid pressure is supplied to the wheel cylinder when a required brake force is less than a maximum regenerative brake force which can be generated by said regenerative brake unit, and
   a brake fluid leak detector is provided for detecting a leak of brake fluid in said hydraulic brake unit based on an operation of said hydraulic brake unit to increase a wheel cylinder pressure.

4. The brake force control apparatus according to claim 1, wherein, when a required brake force is less than a maximum regenerative brake force of the regenerative brake unit, the brake controller controls the hydraulic brake unit so that a constant fluid pressure is supplied to the wheel cylinder.

5. The brake force control apparatus according to claim 1, wherein the hydraulic brake unit includes a pressure source with a pump, a set of linear control valves provided in a pressure passage between the pressure source and the wheel cylinder, and a pressure sensor provided in the pressure passage, and the brake controller controls the set of linear control valves based on an output signal of the pressure sensor, so that the predetermined fluid pressure is supplied from the pressure source to the wheel cylinder via the set of linear control valves.

6. The brake force control apparatus according to claim 5, wherein the hydraulic brake unit further comprises a master cylinder and a master cylinder cut solenoid valve provided in a pressure passage between the master cylinder and the wheel cylinder, and when no malfunction is detected in the brake force control apparatus, the master cylinder cut solenoid valve is set in a closed state.

7. A brake force control apparatus, comprising:
   first braking means for generating a frictional braking force on a wheel of a vehicle by pressing a brake pad against a disk rotor of the vehicle wheel;
   second braking means for generating a regenerative braking force on the wheel; and
   a brake controller for controlling the first braking means and the second braking means so that not only a regenerative braking force but also a predetermined frictional braking force is always exerted on the wheel during a brake operation of a vehicle operator in a condition that a required braking force is less than a maximum regenerative braking force of the second braking means.

8. The brake force control apparatus according to claim 7, wherein the brake controller controls the first braking means so that the first braking means generates a constant frictional braking force on the wheel during the brake operation.

* * * * *